US012627766B2

(12) United States Patent
Reale

(10) Patent No.: US 12,627,766 B2
(45) Date of Patent: May 12, 2026

(54) SYSTEMS AND METHODS FOR AN ARTIFICIAL INTELLIGENCE (AI) LANGUAGE MODEL-ENABLED INTERACTIVE NARRATIVE ENGINE

(71) Applicant: Thomas Reale, Flower Mound, TX (US)

(72) Inventor: Thomas Reale, Flower Mound, TX (US)

(73) Assignee: Postmodern Media LLC, Flower Mound, TX (US)

( * ) Notice: Subject to any disclaimer, the term of this patent is extended or adjusted under 35 U.S.C. 154(b) by 314 days.

(21) Appl. No.: 18/210,749

(22) Filed: Jun. 16, 2023

(65) Prior Publication Data

US 2024/0314260 A1     Sep. 19, 2024

Related U.S. Application Data

(60) Provisional application No. 63/455,038, filed on Mar. 28, 2023, provisional application No. 63/453,095, filed on Mar. 18, 2023.

(51) Int. Cl.
*G10L 15/18*          (2013.01)
*G10L 13/08*          (2013.01)
           (Continued)

(52) U.S. Cl.
CPC ............. *H04N 5/262* (2013.01); *G10L 13/08* (2013.01); *G10L 15/18* (2013.01); *G10L 15/22* (2013.01); *G10L 2015/223* (2013.01)

(58) Field of Classification Search
USPC ............................................... 704/7–10, 257
See application file for complete search history.

(56) References Cited

U.S. PATENT DOCUMENTS 10,699,079 B1     6/2020   Paley et al.
10,747,823 B1     8/2020   Birnbaum et al.
                  (Continued)

OTHER PUBLICATIONS

Wikipedia, "Inform", https://en.wikipedia.org/wiki/Inform, last updated "01:10, May 9, 2023".
                  (Continued)

*Primary Examiner* — Leonard Saint-Cyr
(74) *Attorney, Agent, or Firm* — CHRISTOPHER J CHAN IP LAW, LLC

(57)          ABSTRACT

Embodiments of the disclosure can include systems and methods for an AI language model-enabled interactive narrative engine. In one embodiment, a system can comprise an interactive narrative engine with a voice mode manager module operable to receive a user input including at least one user intent; a service module operable to convert the user input for processing by a natural language processing (NLP) module, wherein based at least in part on the user input, the NLP module passes the resultant processed text to the user command preprocessing switch module, which determines at least one outcome for using the user input as an internal program command or as text in the fiction or non-fiction story or narrative; and an AI language model prompt manager operable to provide the at least one outcome to an AI language model, wherein based at least in part on the at least one outcome, the AI language model provides a response to the user's intent and facilitates narrating or telling the story or narrative.

18 Claims, 4 Drawing Sheets

(51) Int. Cl.
  G10L 15/22        (2006.01)
  H04N 5/262        (2006.01)

(56)                References Cited

U.S. PATENT DOCUMENTS

| | | | |
|---|---|---|---|
| 10,853,583 B1 | 12/2020 | Platt et al. | |
| 10,943,069 B1 | 3/2021 | Paley et al. | |
| 11,562,146 B2 | 1/2023 | Paley et al. | |
| 2013/0145240 A1* | 6/2013 | Anderson | G06F 3/0483 |
| | | | 715/776 |
| 2013/0305153 A1* | 11/2013 | Schwarz | G09B 5/062 |
| | | | 715/730 |
| 2013/0307855 A1* | 11/2013 | Lamb | G06F 3/013 |
| | | | 345/473 |
| 2015/0133023 A1* | 5/2015 | Lewis | A63H 33/26 |
| | | | 446/91 |
| 2015/0142434 A1* | 5/2015 | Wittich | G10L 21/10 |
| | | | 704/235 |
| 2016/0225187 A1* | 8/2016 | Knipp | G06F 40/131 |

OTHER PUBLICATIONS

IFWIKI, "Inform 7", https://www.ifwiki.org/Inform_7, last edited "03:12, Dec. 2, 2022".

Google Groups, "Inform 7: Possible future developments", https://groups.google.com/g/rec.arts.int-fiction/c/PuQHYwtX77c/m/0tSaDy4pjQ8J?pli=1, last edited "7:38:48 AM, Aug. 22, 2007".

Graham Nelson, "Writing with Inform 7", Chapter 2.16: Does Inform really understand English?, https://www.scribd.com/document/62082700/Writing-With-Inform-7#.

Github, "ganelson/inform-evolution", https://github.com/ganelson/inform-evolution.

Twine, "1. Introduction: What is Twine Bad At?", http://twinery.org/reference/en/.

Bitsy, http://www.bitsy.org/.

\* cited by examiner

SYSTEMS AND METHODS FOR AN ARTIFICIAL INTELLIGENCE (AI) LANGUAGE MODEL-ENABLED INTERACTIVE NARRATIVE ENGINE

RELATED APPLICATIONS

The present application claims priority to U.S. Ser. No. 63/453,095, filed Mar. 18, 2023, and U.S. Ser. No. 63/455,038, filed Mar. 28, 2023, the contents of which are both incorporated by reference.

TECHNICAL FIELD

The present disclosure relates to artificial intelligence (AI), and more particularly relates to, systems and methods for an AI language model-enabled interactive narrative engine.

BACKGROUND

Conventional application programs that purport to provide interactive narration of a story or a book have limited support for language processing, and no support for voice participation. As a result, the interactive narration is forced and does not allow for truly "free play." Further, certain application programs can utilize conventional AI-language processing for storytelling, however, these application programs are typically focused on playing through static, pre-existing human-authored content that does not allow user-influenced dynamic content generation within a human-authored story.

In either instance, the user experience with conventional interactive narration application programs and with certain application programs utilizing conventional AI-language processing for storytelling can lead to a greatly diminished user experience. This is because conventional interactive narration programs are deterministic in nature, where playing through a story leads to the same exact outcome, or to a limited number of exactly identical outcomes with each "reading." Some users may lose their place in the story or book, other users may lose interest in the story or book, and yet other users may lose confidence in using conventional interactive narration application programs and certain application programs utilizing conventional AI-language processing for storytelling.

SUMMARY

The present disclosure addresses a need for systems and methods for an AI language model-enabled interactive narrative engine. Applications for the embodiments within the disclosure include, but are not limited to, entertainment through literature, access to AI-enabled interactive narratives for the blind and visually impaired, and supporting literacy development within education systems including early literacy, reading remediation and intervention, and second-language acquisition including English as a second language. Multimodal media support for the embodiments include "Book mode," "Theater mode," and "Film mode," where user input is interpreted by the interactive narrative engine, and a series of AI language model responses will generate, or supplement, a fiction or non-fiction story or narrative in the target media per the user's intent.

Embodiments of the disclosure can include systems and methods for an AI language model-enabled interactive narrative engine. In one embodiment, a system can include an interactive narrative engine with a voice mode manager module operable to receive a user input including at least one user intent; one or more modules operable to convert the user input for processing to discern the at least one user intent, wherein based at least in part on the user input and at least in part on output comprising the at least one user intent from a natural language processing (NLP) module, a user command preprocessing switch module determines at least one outcome for using the user input as an internal program command or as text in the fiction or non-fiction story or narrative; and an AI language model prompt manager operable to provide the at least one outcome to an AI language model, wherein based at least in part on the at least one outcome, the AI language model provides a response to the at least one user intent and facilitates narrating or telling the story or narrative.

In at least one aspect of one embodiment, the user input can include a voice input, a text input, a keyboard input, a mouse input, or a gesture input.

In at least one aspect of one embodiment, the at least one outcome can include at least one of the following: issuing a command within the fiction or non-fiction story or narrative that causes the user's character in the story or narrative to interact with an object in the story or narrative, or to interact with another character in the story or narrative; speaking as the user's character in the story or narrative with another character; or moving as the user's character within the story or narrative.

In at least one aspect of one embodiment, wherein further based at least in part on the at least one outcome: the AI language model receives the user's responses to prompts in order to generate one or more character profiles for a new story or narrative; or the AI language model receives the user's responses to prompts in order to generate one or more character profiles, which are inserted into an existing story or narrative, which is modified so that one or more new characters interact with one or more characters already extant.

In at least one aspect of one embodiment, the system further includes an AI image generator operable to receive the response to the user's intent from the AI language model; and based at least in part on the response, the AI image generator is operable to output one or more images.

In at least one aspect of one embodiment, the system further includes an AI video generator operable to receive the response to the user's intent from the AI language model; and based at least in part on the response, the AI video generator is operable to output one or more video segments.

In at least one aspect of one embodiment, the AI language model can include gpt-4, gpt-3.5-turbo, text-davinci-003, or another large language model.

In another embodiment, a computer-implemented method for providing AI-generated narration in a fiction or non-fiction story or narrative can be provided. The method can include providing an interactive narrative engine operable to receive a user input including at least one user intent; convert the user input for processing to discern the at least one user intent, wherein based at least in part on the user input and at least in part on the at least one user intent, determining at least one outcome for using the user input as an internal program command or as text in the story or narrative; and provide the at least one outcome to an AI language model, wherein based at least in part on the at least one outcome, providing a response to the at least one user intent and facilitates narrating or telling the story or narrative.

In at least one aspect of one embodiment, the user input can include a voice input, a text input, a keyboard input, a mouse input, or a gesture input.

In at least one aspect of one embodiment, the at least one outcome can include at least one of the following: issuing a command within the fiction or non-fiction story or narrative that causes the user's character in the story narrative to interact with an object in the story or narrative, or to interact with another character in the story or narrative; speaking as the user's character in the story or narrative with another character; or moving as the user's character within the story or narrative.

In at least one aspect of one embodiment, wherein further based at least in part on the at least one outcome: the AI language model receives the user's responses to prompts in order to generate one or more character profiles for a new story or narrative; or the AI language model receives the user's responses to prompts in order to generate one or more character profiles, which are inserted into an existing story or narrative, which is modified so that one or more new characters interact with one or more characters already extant.

In at least one aspect of one embodiment, the method can include receiving the response to the user's intent from the AI language model; and based at least in part on the response, outputting one or more images.

In at least one aspect of one embodiment, the method can include receiving the response to the user's intent from the AI language model; and based at least in part on the response, output one or more video segments.

In at least one aspect of one embodiment, the AI language model can include gpt-4, gpt-3.5-turbo, text-davinci-003, or another large language model.

In yet another embodiment, a computer-readable medium comprising computer-executable instructions can be provided. The computer-executable instructions can be operable for receiving a user input comprising at least one user intent; converting the user input for processing to discern the at least one user intent, wherein based at least in part on the user input and at least in part on the at least one user intent, determining at least one outcome for using the user input as an internal program command or as text in the fiction or non-fiction story or narrative; and providing the at least one outcome to an AI language model comprising gpt-4 or another large language model, wherein based at least in part on the at least one outcome, providing a response to the at least one user intent and facilitates narrating or telling the story or narrative, wherein the at least one outcome comprises at least one of the following: issuing a command within the story or narrative that causes the user's character in the story to interact with an object in the story or narrative or to interact with another character in the story or narrative; speaking as the user's character in the story or narrative with another character; or moving as the user's character within the story or narrative.

In at least one aspect of one embodiment, the user input can include a voice input, a text input, a keyboard input, a mouse input, or a gesture input.

In at least one aspect of one embodiment, the computer-executable instructions can be further operable for receiving the response to the user's intent from the AI language model; and based at least in part on the response, outputting one or more images.

In at least one aspect of one embodiment, the computer-executable instructions can be further operable for receiving the response to the user's intent from the AI language model; and based at least in part on the response, outputting one or more video segments.

In one embodiment of the present disclosure, a system and method can provide an application program that allows a user to realistically play one or more characters within a fiction or non-fiction book, and the user's interaction with the application program can be supported by both a text interface and a voice-driven audio interface.

In one embodiment of the present disclosure, a system and method for facilitating relatively limitless fiction content can be provided. In this embodiment, a system and method can provide an application program to facilitate a user to play through multiple fictional stories or non-fiction material, as a character of that story (or reader of non-fiction) via keyboard and screen or microphone and speakers (or both). The system and method can provide an architecture including a user interface, a logic tier, a persistence or data tier, and API interfaces to an external cloud-operated AI language model services providing both text and speech responses.

Figure 1:
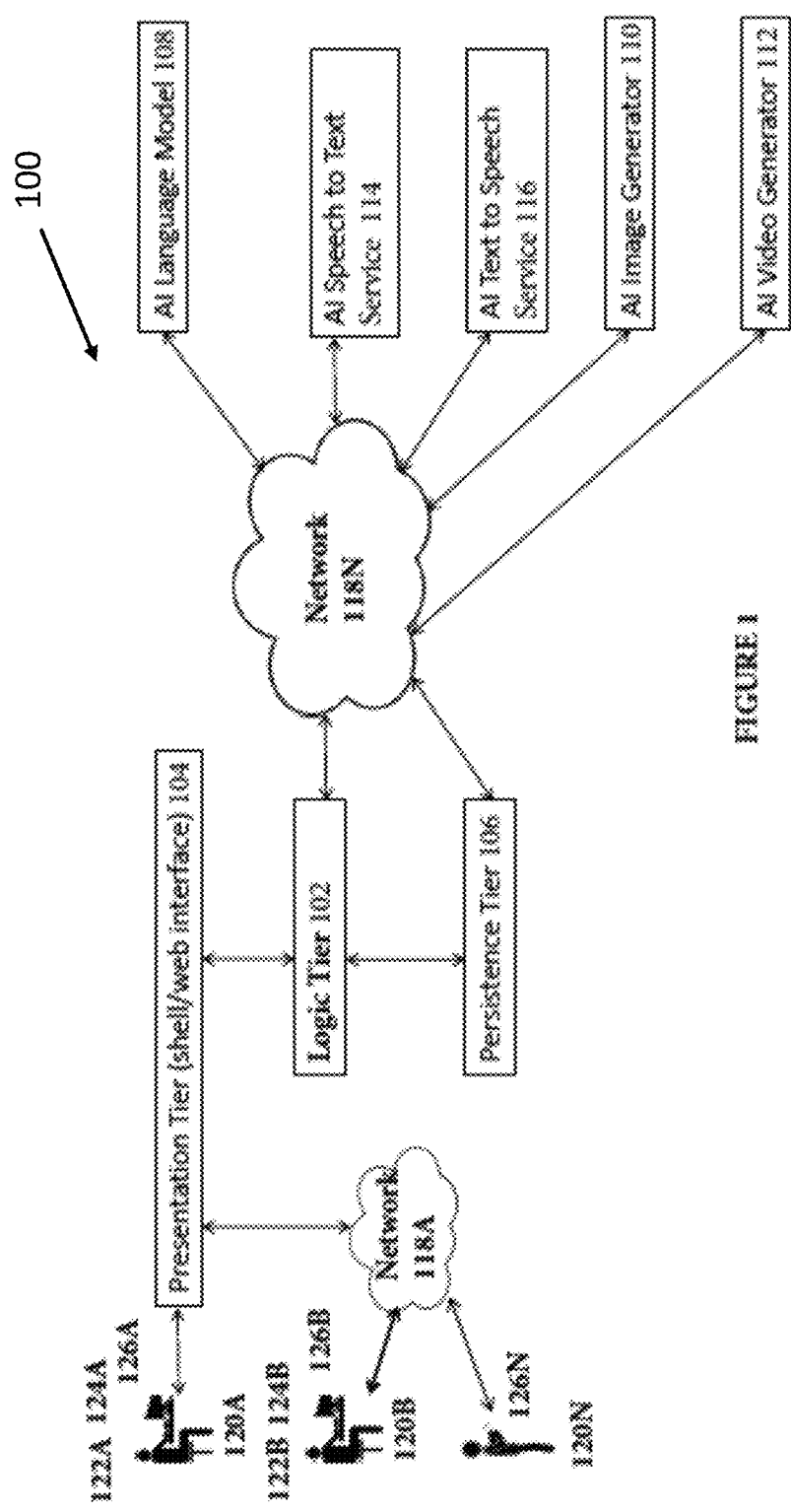
FIG. 1 illustrates an example AI language model-enabled interactive narrative engine architecture, which is an example high-level architecture, and highlights in bold an example logic tier, according to at least one embodiment of the disclosure.

The following detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, when applicable, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems and methods for an AI language model-enabled interactive narrative engine, an AI image generator-enabled story illustrator, and an AI video generator-enabled storyteller. Further, the disclosure relates to implementing interactive narration of a fiction or non-fiction story, narrative or book by an AI language model, the optional illustration of a story narrative, or book by an AI image generator, and the optional adaptation or illustration of a story, narrative, or book by an AI video generator. In each of the embodiments described herein, a processor-based device, such as a computer, mobile phone or tablet, laptop computer, or a server, can implement or otherwise execute instructions to facilitate an AI language model-enabled interactive narrative engine to generate or otherwise supplement a story or narrative. In one or more embodiments, the systems and methods described herein may improve upon current systems and methods utilizing conventional interactive narration application programs as well as certain application programs utilizing conventional AI-language models for storytelling. Such improvements can include technical solutions to improve a user experience to realistically play one or more characters within a story, narrative, or book. Such improvements and technical solutions can also include facilitating a user to play through multiple fictional stories or non-fiction material, as a character of that story or narrative (or reader of non-fiction) via one or more input and output devices, for example, a keyboard and screen or microphone and speakers (or both).

A "story", "narrative", "fiction", "non-fiction", "comics", "audio", "video", or "essay" as used herein, and which can be used interchangeably, can mean any content or material that comprises one or more characters, wherein the one or more characters are depicted in the content or material.

A "book", "play" or "novel" as used herein, and which can be used interchangeably, can mean any published or unpublished format of a story, narrative, fiction, non-fiction, comics, or essay. In a typical use case, a book or essay is an electronically formatted story, narrative, or essay, wherein the text of the book or novel is stored in a data storage device, such as a memory of a processor-based device or a story database.

A user "intent" as used herein can mean a purpose of a user when providing one or more spoken words, device input, gestures, directions, instructions, or commands.

An "outcome" as used herein can mean a consequence or result.

Example Use Cases

In one use case or implementation of the disclosure, a "limitless fiction," or "feral fiction"-type application program and associated system can permit one or more users to play interactively and realistically as a character of or participant in any fiction or non-fiction story, narrative, novel, play, teleplay, children's book, or even non-fiction essay text. Some or all characters and story elements other than the user's character can be played by an AI-language model provided through a service application programming interface (API). The application program and associated system may not be dependent on any one specific AI language model, and may interchangeably use any suitable model. In one embodiment, the AI language model can be gpt-4, gpt-3.5-turbo, text-davinci-003, each provided by OpenAI. In another embodiment, the AI language model can be any generally available large language model.

In another use case or implementation of the disclosure, an "intelligent comics" or "you tell a story"-type application program and associated system can permit one or more users to interactively write and then automatically illustrate a comic book or children's book. The text of the underlying story of the comic book or children's book can be interactively generated in cooperation with an AI language model provided through a service application programming interface (API). The AI-language model can, through prompting, break down the story into constituent parts and, through a service application programming interface (API) present each statement of the part of a story to an AI image generator to illustrate the story with interaction from the user. The application program and associated system may not be dependent on any one specific AI image generator, and may interchangeably use any suitable generator. In one embodiment, the AI image generator can be Midjourney, distributed by Midjourney, Inc.

In another use case or implementation of the disclosure, a "read and write with me"-type application program and associated system can permit the user to interactively create one or more characters by answering a series of prompt questions causing the system to build a profile of one or more characters including data points such as the character's name, physical description, where they live, what is important to the character, what goals the character has, etc. Cooperatively created characters can then be used in conjunction with the other use cases of the disclosure to generate a book, play, or video as a new fiction or non-fiction story or narrative. Alternatively, an interactively user-generated character can be introduced into an existing fiction or non-fiction story or narrative involving characters that are already extant.

In yet another use case or implementation of the disclosure, a "moving comics" or "you tell a moving story"-type application program and associated system can permit one or more users to interactively write and then automatically generate videos to accompany a comic book or children's book, or adapt the story into video format. The text of the fiction or non-fiction story or narrative can be interactively generated in cooperation with an AI language model provided through a service application programming interface (API). The AI language model can, through prompting, break down the story or narrative into constituent parts and, through a service application programming interface (API) present each statement of the part of a story or narrative to an AI video generator to generate video format of parts of the story or narrative or the complete story or narrative with interaction from the user. The application program and associated system may not be dependent on any one specific AI video generator, and may interchangeably use any suitable generator. In one embodiment, the AI video generator be Imagen Video, distributed by Google, LLC.

FIG. 1 illustrates an example AI language model-enabled interactive narrative engine architecture or system 100, according to at least one embodiment of the disclosure. The system 100 shown illustrates an example high-level architecture, and can include an example logic tier 102, a presentation tier 104, a persistence tier 106, an AI language model 108, an AI image generator 110, an AI video generator 112, an AI speech to text service 114, and an AI text to speech service 116. Each of the components 102-116 can communicate with each other via at least one network 118A-118N, or may, in some instances, communicate with one another directly. As shown in FIG. 1, one or more users 120A-120N may interact with the system 100 in at least one example mode described as follows.

In a first example mode, a user, such as 120A, can input via a keyboard 122A or other input device desired text then displayed or otherwise output on an associated display screen 124A. The user input can be directly received by a presentation tier 104, such as a computer operating system shell executing on a processor-based device, such as a computer 126A. The presentation tier 104 can directly interface with a logic tier 102 and communicate the received user input to the logic tier 102. In some instances, the presentation tier 104 can transmit the received user input via one or more networks 118A-118N to the logic tier 102.

In a second example mode, a user, such as 120B, can input via a keyboard 122B desired text displayed or otherwise output on an associated display screen 124B. The user input can be transmitted through one or more networks 118A-118N via a web browser or Internet browser application program executing on an associated processor-based device, such as a computer 126B. The transmitted user input can be received by a presentation tier 104, hosted on another processor-based device such as a computer or server, that can include a web interface that can interface with and communicate the transmitted user input to the logic tier 102.

In a third example mode, a user, such as 120N, can input spoken voice commands to an AI speech-to-text service 114 via at least one application programming interface (API) associated with a processor-based device 126N, such a mobile phone, in communication with one or more networks 118A-118N. The AI speech-to-text service 114 can interpret the user input spoken voice commands, and transmit the interpreted user input spoken voice commands via the at least one networks 118A-118N to the logic tier 102. Note that the system 100 is not dependent on any one specific AI speech-to-text service, and may interchangeably use any suitable service.

In a fourth mode, a user, such as 120N, can input spoken text to an AI speech-to-text service 114, and receive output via an AI text-to-speech service 116 via separate and respective application programming interfaces (APIs). In this instance, at least one API may be associated with a processor-based device 126N, such a mobile phone, in communication with one or more networks 118A-118N. The AI speech-to-text service 114 can generate text from the user's voice input, and transmit the text via at least one network 118A-118N to the logic tier 102. Once the user's input has been processed, the logic tier 102 can present text to an AI text-to-speech service 116 that synthesizes speech and presents the resultant audio back to the user 120N via at least one network 118A-118N. Note that the system 100 is not dependent on any one specific AI speech-to-text or AI text-to-speech service, and may interchangeably use any suitable service.

In a fifth mode, a user, such as 120B, can input a selection using a keyboard or mouse, the user selection can be transmitted via a web browser or Internet browser application program executing on an associated processor-based device, such as a computer 126B. The transmitted user input can be received via one or more networks 111A-118N by a presentation tier 104 that can include a web interface that can interface with and communicate the transmitted user input to the logic tier 102.

In any instance, user input received via at least one of the described modes can be received by or otherwise transmitted to the logic tier 102 for further processing by the system 100. The logic tier 102 can process the language content of the user's input and/or output interpreted or generated by an AI service, either AI speech to text service 114 or AI text to speech service 116, based at least in part of a user input. The language content of the user's input and/or output interpreted or generated by the AI service 114, 116 based at least in part of a user input can include one or more words, phrases, commands, questions, or instructions. Thus, a user input can include, but is not limited to, a voice input, a text input, a keyboard input, a mouse input, or a gesture input.

The example logic tier 102 shown in FIG. 1 can include one more processing modules, illustrated and described below in FIG. 2. In one example embodiment, as shown in the system 200 of FIG. 2, the one or more processing modules of a logic tier 102 can include a voice mode manager module 202, a natural language processing (NLP) input preprocessor module 204, a user command preprocessing switch module 206, an AI language model prompt manager 208, an AI image generator prompt manager 210, and an AI video generator prompt manager 212. Note that the logic tier 102 can be coded in or otherwise written in the Python programming language, but any suitable language can be used to code or otherwise provide instructions for the logic tier 102.

Figure 3:
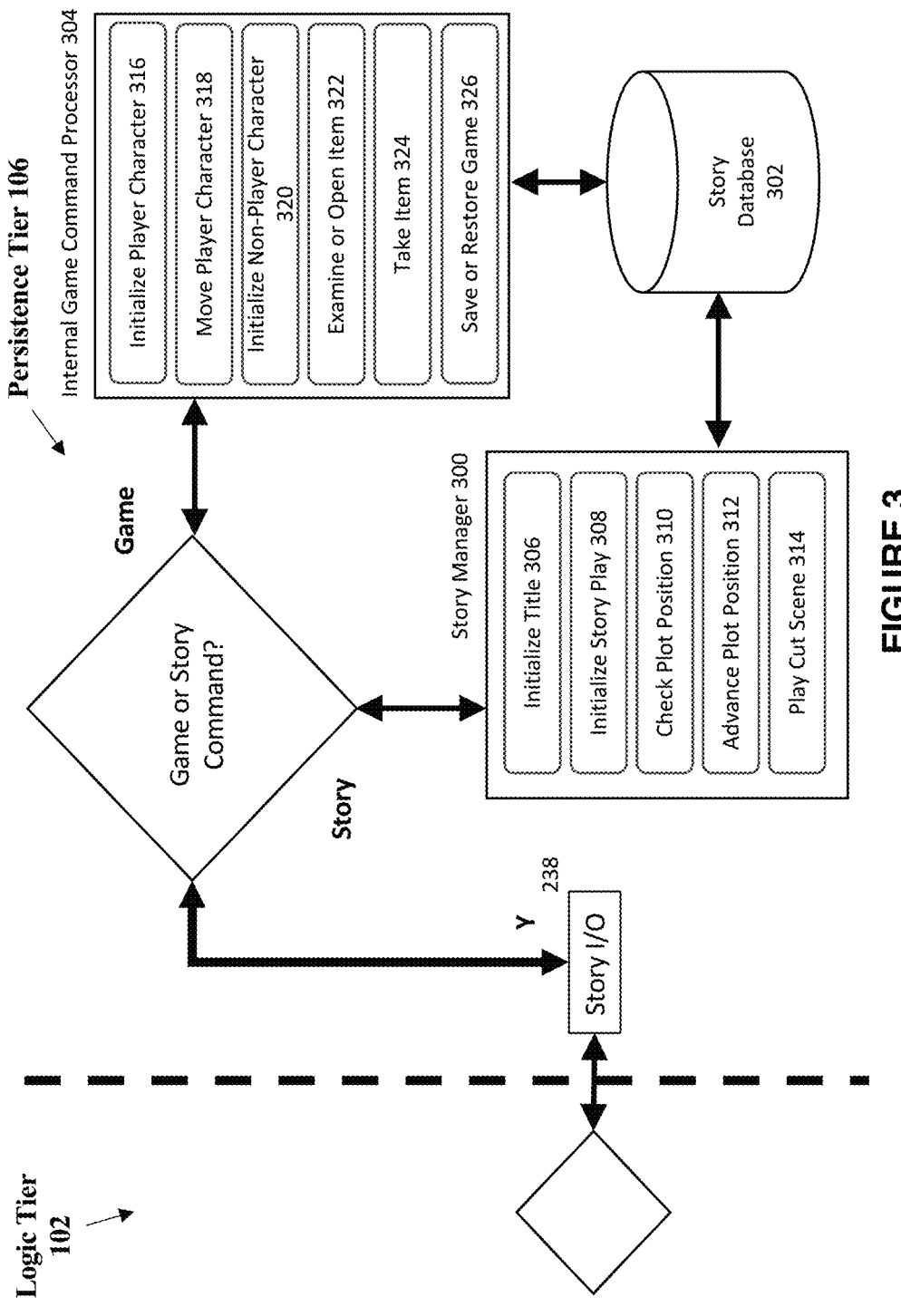
FIG. 3 illustrates an example persistence tier for an AI language model-enabled interactive narrative engine and associated information process flow with various example interfaces of the example persistence tier, according to at least one embodiment of the disclosure.

The example persistence tier 106, also known as a data tier, shown in FIG. 1 can include a story manager and an internal game command processor, as further described and shown in FIG. 3. The persistence tier 106, or data tier, can provide story and/or game data (shown as "Story I/O 238") to the logic tier 102 as needed. The story manager, shown as 300 in FIG. 3, can store one or more fiction or non-fiction stories and/or underlying fiction or non-fiction stories for a book in an associated story database 302, and interact with the story database 302 as needed when certain story commands are received from a user or the system. The internal game command processor, shown as 304 in FIG. 3, can interact as needed with the story database 302 as certain game commands are received from a user or the system.

In the example shown, the story manager 300 can facilitate, execute, or otherwise host one or more modules including, but not limited to, initialize title 306, initialize story play 308, check plot position 310, advance plot position 312, and play cut scene 314. Further, the internal game command processor 304 can facilitate, execute, or otherwise host one or more modules including initialize player character 316, move player character 318, initialize non-player character 320, examine or open item 322, take item 324, and save or restore game 326. Each of the modules can include computer code, instructions, or commands, which may be executed or otherwise processed by the persistence tier 106 and/or an associated component such as a computer processor. In this manner, the logic tier 102 described above can interact with the persistence tier 106, or data tier, and various other associated components as needed to facilitate user interaction or interactivity with a fiction or non-fiction story and/or underlying fiction or non-fiction story of a book.

The below example illustrates interactions between a user and a system illustrated in FIGS. 2 and 3, and illustrates various system outputs from a user's perspective. Also described are the interactions between system components illustrated in FIGS. 2 and 3, and various outputs from the system's perspective how the various components of a system architecture of at least one embodiment can work together as information flows between the user, the AI language model 226, and the various components of the persistence tier 106. The example is an excerpt from a session of a "limitless fiction" or "feral fiction"-type application program. The user is playing, for example, a science-fiction thriller titled "2222."

In this example embodiment, various components of the logic tier 102 can interact with components of the persistence tier 106 to implement the session. The logic tier components in this example can include, but are not limited to, the voice mode manager module 202, a natural language processing (NLP) input preprocessor 204, a user command preprocessing switch module 206, and the AI language model 226. Further, components for the persistence tier 106 can include, but are not limited to, the story manager 300, the story database 302, and the internal game command processor 304.

Each of the components can generate or otherwise facilitate providing certain content and/or output. That is, the voice mode manager module 202 can generate or otherwise process user input from a user, the AI language model 226 can generate or otherwise provide language model-generated content, the story manager 300 can retrieve and process human-authored content, the story database 302 can store human-authored content, and the internal game command processor 304 can generate or otherwise provide game command-related content.

The example session begins with the story manager 300 receiving a command, and the story manager 300 loading or otherwise initializing a predefined title, such as the science-fiction thriller titled "2222".

Based at least in part on the predefined title from the story manager 300, the internal game command processor 304 loads data associated with one or more predefined characters associated with the title.

Based at least in part on the predefined characters, the internal game command processor 304 determines which of the predefined character(s) have been selected in advance by the human author to be played by the user. In this example, a character named DL5 is to be played by the user.

Based at least in part on these inputs from the internal game command processor 304, the human-authored description of the user's character is retrieved. A user command preprocessing switch module 206 determines which component of the logic tier 102 should receive the retrieved content for processing, and based at least in part on this input supplies the content to an AI language model prompt manager 208. The AI language model prompt manager 208 modifies the text with instructions intended to shape the response of an AI language model 226, which in turn generates or otherwise provides language model content or an output such as, "You stand poised in the north corridor of the Green Bunker, a seasoned special agent of unparalleled skills and an unwavering determination. The memory of your fallen family fuels your relentless pursuit of justice."

Based at least in part on the content or output from the AI language model 226, the internal game command processor 304 loads data associated with a generated location, such as "the north corridor".

Based at least in part on the generated location from the internal game command processor 304, the story database 302 can retrieve or otherwise provide previously stored human-authored content, such as "You walk down the long corridor of the north wing of the 17th level of the Green Bunker. You reach a door that reads Chief of Department. As you walk forward, the scanner reads your irises and the door to the Chief of Department suite slides open to a sparely appointed waiting area. A voice instructs, 'Take a seat if you wish.' But before choosing to sit or stand, the door swings open and the Chief of Department beckons, 'DL5, come in please.'"

Based at least in part on the human-authored content from the story database 302, the voice mode manager module 202 can generate or otherwise provide user input from a user, such as a "go inside" command or input.

Based at least in part on the user input from the voice mode manager module 202, and processing by a natural language processing (NLP) input preprocessor module 204 and the user command preprocessing switch module 206, the internal game command processor 304 can generate or otherwise provide game command processor content, such as "chief's office" or a location.

Based at least in part on the generated location from the internal game command processor 304, respective instructions from the check plot position 310 and advance plot position 312 modules can determine whether to provide a generic description of the room entered, or to play a cut scene. Based at least in part on output from check plot position 310 and advance plot position 312 modules, instructions from the play cut scene 314 module can access the story database 302 to retrieve or otherwise provide previously stored human-authored content, such as "The Chief gestures to the guest chair in her sparsely appointed office. 'Take a seat. I have for you a case of utmost sensitivity. The assignment will involve a journey to Trefethen, the fourth planet in the Cartarian system. Under the treaty of 2195, the People and The Pure run a joint provincial government, and there are corporate entities on either side with mineral rights awarded under commerce clauses in the treaty. A month ago, there was a mining accident on Trefethen, the fourth planet in the Catarian system that resulted in the death of a mine worker. Our embedded asset field agent QM12 suspected it was no accident at all. QM12's cover is as a barmaid in a down market saloon called The Crow Bar. She had been developing the miner in question as an informant. QM12 has been missing for a week.' The Chief pauses to allow for the gravity of this news to register. The Chief pushes a rolling bag and a backpack in your direction. The backpack is marked, Pinnacle Home and Life just below the corporate logo. 'Here is your bag with clothing supporting your cover identity toiletries and the like. And the backpack is the usual field tool kit. Your transport leaves in the morning at 6. Your mission is to find QM12 get to the truth about the mining accident. Good luck and Godspeed.'"

Based at least in part on input from the user, the voice mode manager module 202 passes user input such as "take the dossier" to a natural language processing (NLP) input preprocessor module 204 and the user command preprocessing switch module 206, which determine the user's intent and activate the corresponding module within the internal game command processor 304. For example, determining a user's intent or purpose of "taking the dossier" can be discerned by the NLP preprocessor module 204 from the user's input "take the dossier," which can be provided by the user via one or more spoken words, device input, gestures, directions, instructions, or commands. In another example, determining a user's intent or purpose can be discerned from an event or a user's intended command, which can be provided by the user via one or more spoken words, device input, gestures, directions, instructions, or commands. Based at least in part on the user's intent from the NLP preprocessor module 204, the user command preprocessing switch module 206 can communicate with or otherwise active the corresponding module within the internal game command processor 304, such as the take item 324 module. Process execution by the corresponding module, such as the take item 324 module, in the internal game command processor 304 can result in the retrieval of human-authored content from the story database 302, and based at least in part on this input, the story database 302 supplies the content to an AI language model prompt manager 208. The AI language model prompt manager 208 modifies the text with instructions intended to shape the response of an AI language model 226.

Based at least in part on these inputs from the AI language model prompt manager 208, the AI language model 226 generates or otherwise provides language model content or an output such as, "Dossier in hand, mission awaits."

Based at least in part on the language model content from the AI language model 226, the voice mode manager module 202, a natural language processing (NLP) input preprocessor module 204, and the user command preprocessing switch module 206, can process or otherwise provide user input from a user, such as an "Is there anything else I need to know?" command or input. Based at least in part on this input, the NLP input preprocessor module can help determine the user's intent, and communicates with the user command preprocessing switch module 206 to supply suitable text content to an AI language model prompt manager 208. The AI language model prompt manager 208 modifies the text content with instructions intended to shape the response of the AI language model 226.

Based at least in part on these inputs the AI language model prompt manager 208, the AI language model 226 generates or otherwise provides language model content or an output, such as "Ellen nods, her ice-blue reptilian eyes meeting yours. 'Be cautious, DL5. Trust no one. The Cartarian system is treacherous. Stay undercover, retrieve QM12, uncover the truth. Remember, appearances deceive. Keep your wits sharp, adapt swiftly. The fate of our operation rests on your success. Godspeed.'"

Based at least in part on the language model content from the AI language model 226, the voice mode manager module 202 can process or otherwise provide user input from a user, such as a "leave" command or input.

Based at least in part on the user input from the voice mode manager module 202, processing by a natural language processing (NLP) input preprocessor module 204, and processing by the user command preprocessing switch module 206, the internal game command processor 304 can generate or otherwise provide game command processor content, such as "the north corridor" or a location.

Based at least in part on the generated location from the internal game command processor 304, the story database 302 can retrieve or otherwise provide previously stored human-authored content that describes the user character's current location, and pass it to the user command preprocessing switch module 206, which then sends the description to the AI language model prompt manager 208. The AI language model prompt manager 208 modifies the text with instructions intended to shape the response of the AI language model 226.

Based at least in part on these inputs from the AI language model prompt manager 208, the AI language model 226 generates or otherwise provides language model content or an output, such as "The dimly lit corridor stretches ahead, translucent floors casting a soft glow. Office doors line both sides, concealing secrets within. A door labeled 'Chief of Department' beckons from the north, while the lift awaits at the corridor's eastern end. DL5 stands poised, ready for the next move."

Turning back to FIG. 2, the example logic tier 200 shown in FIG. 2 illustrates an associated information process flow between the various example interfaces and components of the example logic tier 200, according to at least one embodiment of the disclosure. The logic tier 200 also illustrates an associated information process flow for an AI image generator 214 and an AI video generator 216, shown with various example interfaces of the example logic tier 200, according to at least one embodiment of the disclosure.

Figure 2:
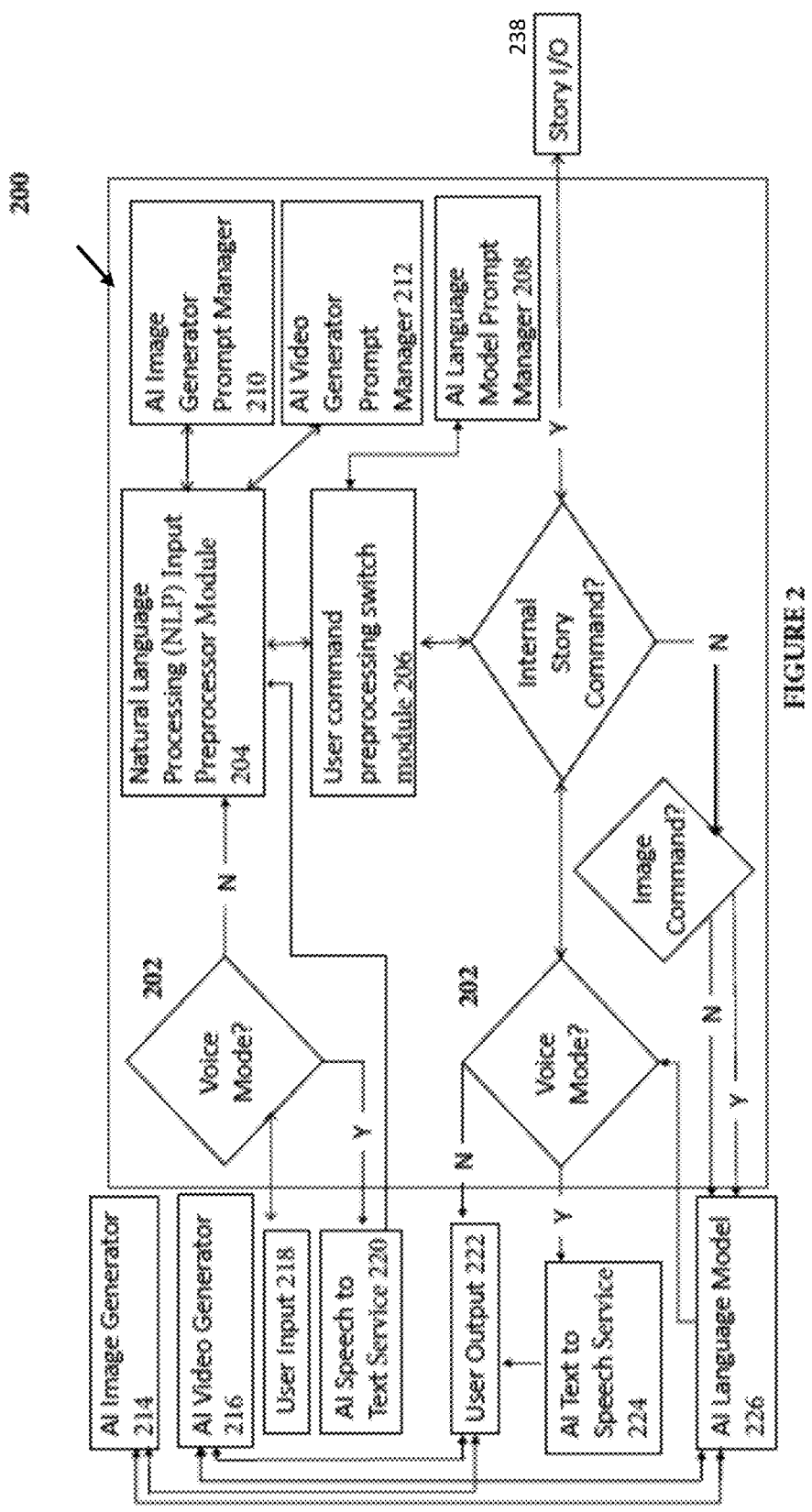
FIG. 2 illustrates an example logic tier for an AI language model-enabled interactive narrative engine and associated information process flow with various example interfaces of the example logic tier, according to at least one embodiment of the disclosure.

Example relationships between the various example modules are graphically represented in FIG. 2.

A voice mode manager module 202 can initially receive a user input 218 and communicate or otherwise transmit the user input to an AI speech-to-text service 220. The voice mode manager module 202 can also receive an output 222 from the logic tier 200 and communicate or otherwise transmit the output to an AI text-to-speech-service 224, creating synthesized speech for presentation to the user. The voice mode manager module 202 can manage the voice mode to be used, and the module 202 can include one or more interfaces to the AI speech-to-text service 220 and AI text-to-speech service 224. The voice mode manager module 202 may be activated at a preference of a user in order to play through a fiction or non-fiction story or narrative using a completely audio interface.

A natural language processing (NLP) input preprocessor module 204 can receive a user input 218 from the voice mode manager module 202, and analyze the user input 218 to help determine or otherwise discern the user's intent. Based at least in part on output from the NLP input preprocessor module 204, the user command preprocessing switch module 206 can determine or otherwise discern if the user intends or is otherwise meaning to (1) issue a command within a story that would cause the user's character to physically interact with an object or other character in some way (e.g., pick up an item); (2) speak as the user's character with another character; or (3) move as the user's character within the fiction or non-fiction story or narrative (e.g., "go inside"). The output or determined outcome from the user command preprocessing switch module 206 can determine whether the command from the user is handled as an internal program command or internal game command, which is managed by the persistence tier shown as 106 in FIG. 1, or as a playable text to be presented to an AI language model prompt manager, such as 208. In this example, a user's intent can be determined from a user input.

The AI language model prompt manager 208 can receive output from the user command preprocessing switch module 206, and the AI language model prompt manager 208 can craft or otherwise generate prompt language to be sent by the AI language model prompt manager 208 to the AI language model 226 causing the model 226 to respond in kind to the user's intent. For example, if the user intends for the user's character to speak with another character (e.g., a character named, "Joe" within the story) then the prompt language from the AI language model prompt manager 208 can instruct the AI language model 226 to provide a response as "Joe" in the first person. In another example, if the user intends for the text of a story to be illustrated automatically, then the prompt language from the AI language model prompt manager 208 can break down the text into provided cues to be presented via the AI language model 226 to an AI image generator 214 for illustration. In yet another example, if the user intends for the text of a fiction or non-fiction story or narrative to be illustrated automatically, then the prompt language from the AI language model prompt manager 208 can break down the text into provided cues to be presented via the AI language model 226 to an AI video generator 216 for video creation. By way of example, a suitable AI language model can include, but is not limited to, gpt-4, gpt-3.5-turbo, text-davinci-003, each provided by OpenAI, or another large language model. In this manner, an outcome can be generated, crafted, or otherwise provided as a consequence or result in response to a user's intent.

The AI image generator prompt manager 210 can receive output from the AI language model 226, and revise the output to generate prompt language to be sent to the AI image generator 214 in a way that causes the AI image generator 214 to create one or more images that match the cues and captions as described in the prompts. For example, if a user presents a short narrative that can be broken down into ten distinct images or "pages," the AI image generator prompt manager 210 can provide one or more images for the user to select to add to each page. Similarly, the AI video generator prompt manager 212 can receive output from the AI language model 226, and revise the output to generate prompt language to be sent to the AI video generator 216 in a way that causes the AI video generator 216 to create one or more video segments that match the cues and captions as described in the prompts. For example, if a user presents a short narrative that can be broken down into four short videos or "scenes," an AI video generator prompt manager 212 can provide a video that matches the cue.

The user command preprocessing switch module 206 can receive an event when other preprocessing activities are relatively complete and the prompt language is set. The event received by the user command preprocessing switch module 206 can be analyzed to determine a user's intent from a user's intended command. Upon receiving a user's intended command, the user command preprocessing switch module 206 can transmit the determined user's intended command either to the logic tier 102, which can generate an internal response within the system 100 to the user's intended command; or the determined user's intended command can be transmitted to the AI language model 226, which can model the other characters and can provide relatively complex commands for relatively natural storytelling. In this example, a user's intent can be determined from an event or user's intended command.

If the response is generated by the AI language model 226, the text of that response is presented to the user. If the response is generated by the logic tier 102, the response is passed to the AI language model 226. In this manner, the AI language model 226 can be kept informed of some or all events that have occurred with the fiction or non-fiction story or narrative, and may, optionally, be used to wash or otherwise normalize the text via the AI language model 226 in order to keep the writing style of the story or narrative relatively consistent throughout.

In one embodiment of the disclosure, a system and method can provide an online service that permits users to access any number of fiction or non-fiction stories or narratives across one or more genres.

In one embodiment of the disclosure, a system and method may also be embedded within other external applications (e.g., online educational literacy programs) to encourage the extended use of those applications.

The operations described and depicted in the illustrative process flows of FIGS. 2 and 3 may be carried out or performed in any suitable order as desired in various example embodiments of the disclosure. Furthermore, in certain example embodiments, less, more, or different operations than those depicted in FIGS. 2 and 3 may be performed.

One or more operations of the process flows of FIGS. 2 and 3 may have been described above as being performed by one or more tiers, program modules, applications, or the like executing on a device. It should be appreciated, however, that any of the operations of process flows of FIGS. 2 and 3 may be performed, at least in part, in a distributed manner by one or more other devices, or more specifically, by one or more tiers, program modules, applications, or the like executing on such devices. In addition, it should be appreciated that processing performed in response to execution of computer-executable instructions provided as part of a tier, program module, application, or the like may be interchangeably described herein as being performed by the tier, program module, or application itself or by a device on which the tier, program module, application, or the like is executing.

Figure 4:
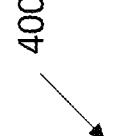
FIG. 4 illustrates an example system or apparatus for an AI language model-enabled interactive narrative engine, according to at least one embodiment of the disclosure.
Figure 4:
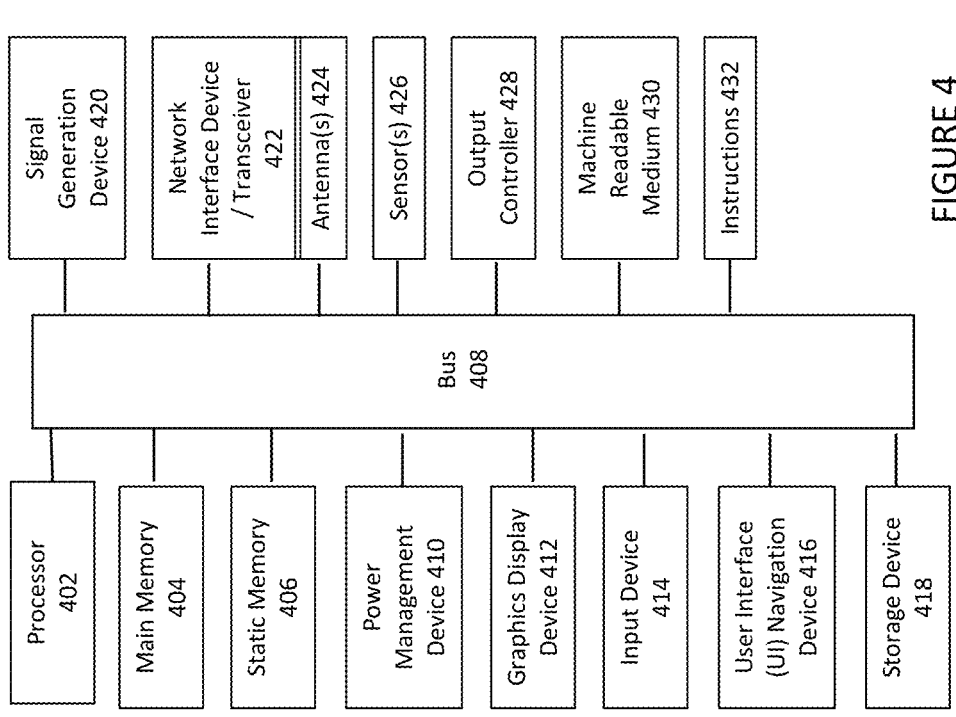

FIG. 4 is a block diagram of an example of a machine or system 400 for an AI language model-enabled interactive narrative engine, in accordance with one or more example embodiments of the disclosure.

In other embodiments, the machine or system 400 may operate as a standalone device or may be connected (e.g., networked) to other machines. In a networked deployment, the system 400 may operate in the capacity of a server machine, a client machine, or both in server-client network environments. In an example, the machine or system 400 may act as a peer machine in peer-to-peer (P2P) (or other distributed) network environments. The system 400 may be a server (e.g., a real-time server), a computer, an automation controller, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuration may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine or system (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine or system 400 may further include a power management device 410, a graphics display device 412, an input device 414 (e.g., a keyboard), and a user interface (UI) navigation device 416 (e.g., a mouse). In an example, the graphics display device 412, input device 414, and UI navigation device 416 may be a touch screen display. The machine or system 400 may additionally include a storage device (i.e., drive unit) 418, a signal generation device 420 (e.g., an emitter, a speaker), a network interface device/transceiver 422 coupled to antenna(s) 424, and one or more sensors 426, such as a global positioning system (GPS) sensor, a compass, an accelerometer, or other sensor. The machine or system 400 may include an output controller 428, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 418 may include a machine readable medium 430 on which is stored one or more sets of data structures or instructions 432 (e.g., software) embodying or utilized by any one or more of the techniques or functions described herein. For example, the data structures or instructions can embody or can be utilized by the functions and techniques described with respect to FIGS. 1-3. The instructions 432 may also reside, completely or at least partially, within the main memory 404, within the static memory 406, or within the hardware processor 402 during execution thereof by the machine or system 400. In an example, one or any combination of the hardware processor 402, the main memory 404, the static memory 406, or the storage device 418 may constitute machine-readable media.

While the machine-readable medium 430 is illustrated as a single medium, the term "machine-readable medium" may include a single medium or multiple media (e.g., a centralized or distributed database, and/or associated caches and servers) configured to store the one or more instructions 432.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by a machine or device and that cause the machine or device to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

The instructions may further be transmitted or received over a communications network using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to the communications network. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine or device and includes digital or analog communications signals or other intangible media to facilitate communication of such software.

The word "exemplary" is used herein to mean "serving as an example, instance, or illustration." Any embodiment described herein as "exemplary" is not necessarily to be construed as preferred or advantageous over other embodiments. The terms "monitoring and computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

The invention claimed is:

1. A system for providing AI-generated narration content in a story with dynamically-generated content in response to an input from a user, the system comprising an interactive narrative engine comprising:

a voice mode manager module operable to:

receive a user input wherein the user identifies as a predefined character to play in the story; and receive a user input comprising at least one user intent to interact, speak, or move as the predefined character played by the user in the dynamically-generated content in the story;

one or more modules operable to convert the user input for processing to discern the at least one user intent, wherein based at least in part on the user input and at least in part on output comprising the at least one user intent from a natural language processing (NLP) module, a user command preprocessing switch module determines at least one outcome for using the user input as an internal program command or as text for the user playing the predefined character in the dynamically-generated content in the story; and an AI language model prompt manager operable to provide the at least one outcome to an AI language model, wherein based at least in part on the at least one outcome, the AI language model provides a response to the at least one user intent and facilitates narrating or telling the dynamically-generated content with the user playing the predefined character in the story; and wherein the dynamically-generated content with the user playing the predefined character in the story is output to the user via an output device.

2. The system of claim 1, wherein the user input comprises a voice input, a text input, a keyboard input, a mouse input, or a gesture input.

3. The system of claim 1, wherein the at least one outcome comprises at least one of the following:

issuing a command within the story that causes the user's character in the dynamically-generated content in the story to interact with an object in the story, or to interact with another character in the story;

speaking as the user's character in the story with another character; or moving as the user's character within the story.

4. The system of claim 1, wherein further based at least in part on the at least one outcome:

the AI language model receives the user's responses to prompts in order to generate one or more character profiles for a new story or narrative; or the AI language model receives the user's responses to prompts in order to generate one or more character profiles, which are inserted into an existing story or narrative, which is modified so that one or more new characters interact with one or more characters already extant.

5. The system of claim 1, further comprising:

an AI image generator operable to receive the response to the user's intent from the AI language model; and based at least in part on the response, the AI image generator is operable to output one or more images.

6. The system of claim 1, further comprising:

an AI video generator operable to receive the response to the user's intent from the AI language model; and based at least in part on the response, the AI video generator is operable to output one or more video segments.

7. The system of claim 1, wherein the AI language model comprises gpt-4, gpt-3.5-turbo, text-davinci-003, or another large language model.

8. A computer-implemented method for providing AI-generated content in a story with dynamically-generated content for a user to play a predefined character in the story, the method comprising:

providing an interactive narrative engine operable to:

receive a user input comprising at least one user intent to interact, speak, or move as a predefined character played by the user in the dynamically-generated content in the story;

convert the user input for processing to discern the at least one user intent, wherein based at least in part on the user input and at least in part on the at least one user intent, determining at least one outcome for using the user input as an internal program command or as text in the dynamically-generated content for the user playing the predefined character in the story;

provide the at least one outcome to an AI language model, wherein based at least in part on the at least one outcome, providing a response to the at least one user intent and facilitate narrating or telling the dynamically-generated content for the user playing the predefined character in the story; and outputting the dynamically-generated content for the user playing the predefined character in the story via an output device.

9. The computer-implemented method of claim 8, wherein the user input comprises a voice input, a text input, a keyboard input, a mouse input, or a gesture input.

10. The computer-implemented method of claim 8, wherein the at least one outcome comprises at least one of the following:

issuing a command within the dynamically-generated content in the story that causes the user's character in the dynamically-generated content in the story to interact with an object in the dynamically-generated content in the story, or to interact with another character in the dynamically-generated content in the story;

speaking as the user's character in the dynamically-generated content in the story with another character; or moving as the user's character within the dynamically-generated content in the story.

11. The computer-implemented method of claim 8, further comprising:

receive the response to the user's intent from the AI language model; and based at least in part on the response, output one or more images.

12. The computer-implemented method of claim 8, further comprising:

receive the response to the user's intent from the AI language model; and based at least in part on the response, output one or more video segments.

13. The computer-implemented method of claim 8, wherein the AI language model comprises gpt-4, gpt-3.5-turbo, text-davinci-003, or another large language model.

14. A non-transitory computer-readable medium comprising computer-executable instructions for:

receiving a user input comprising at least one user intent to interact, speak, or move as a predefined character played by the user in dynamically-generated content in a story or narrative;

converting the user input for processing to discern the at least one user intent, wherein based at least in part on the user input and at least in part on the at least one user intent, determining at least one outcome for using the user input as an internal program command or as text in the dynamically-generated content for the user playing the predefined character in the story or narrative;

providing the at least one outcome to an AI language model comprising gpt-4 or another large language model, wherein based at least in part on the at least one outcome, providing a response to the at least one user intent and facilitating narrating or telling the dynamically-generated content for the user playing the predefined character in the story or narrative; and outputting the dynamically-generated content for the user playing the predefined character in the story or narrative via an output device, and wherein the at least one outcome comprises at least one of the following:

issuing a command within the dynamically-generated content in the story or narrative that causes the user's character in the dynamically-generated content in the story or narrative to interact with an object in the dynamically-generated content in the story or narrative, or to interact with another character in the dynamically-generated content in the story or narrative;

speaking as the user's character in the dynamically-generated content in the story or narrative with another character; or moving as the user's character within the dynamically-generated content in the story or narrative.

15. The computer-readable medium of claim 14, wherein the user input comprises a voice input, a text input, a keyboard input, a mouse input, or a gesture input.

16. The computer-readable medium of claim 14, further comprising computer-executable instructions for:

receiving the response to the user's intent from the AI language model; and based at least in part on the response, outputting one or more images.

17. The computer-readable medium of claim 14, further comprising computer-executable instructions for:

receiving the response to the user's intent from the AI language model; and based at least in part on the response, outputting one or more video segments.

18. The computer-readable medium of claim 14, wherein further based at least in part on the at least one outcome: the AI language model receives the user's responses to prompts in order to generate one or more character profiles for a new story or narrative; or the AI language model receives the user's responses to prompts in order to generate one or more character profiles, which are inserted into an existing story or narrative, which is modified so that one or more new characters interact with one or more characters already extant.

* * * * *